(12) United States Patent
Yamamoto et al.

(10) Patent No.: US 6,828,955 B2
(45) Date of Patent: Dec. 7, 2004

(54) IMAGE DISPLAY MEDIUM AND IMAGE FORMATION APPARATUS

(75) Inventors: Yasuo Yamamoto, Minamiashigara (JP); Chisato Urano, Minamiashigara (JP); Yoshihiro Inaba, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 380 days.

(21) Appl. No.: 09/987,054

(22) Filed: Nov. 13, 2001

(65) Prior Publication Data

US 2002/0126067 A1 Sep. 12, 2002

(30) Foreign Application Priority Data

Dec. 28, 2000 (JP) ........................................ 2000-402885

(51) Int. Cl.$^7$ ................................................ G09G 3/34
(52) U.S. Cl. ........................... 345/107; 349/86; 349/89; 359/296
(58) Field of Search ........................ 345/107; 359/296; 349/86, 89, 92; 204/600; 430/32–38

(56) References Cited

U.S. PATENT DOCUMENTS 3,909,116 A * 9/1975 Kohashi .................... 359/228
5,470,893 A * 11/1995 Sinclair-Day et al. ...... 523/205
6,451,941 B1 * 9/2002 Urashima et al. ........... 526/212

OTHER PUBLICATIONS

Gugrae–Jo et al. "New Toner Display Device (I), Image Display Using Conductive Toner and Charge Transport Layer", Graduate School of Science and Technology, Chiba University, pp. 249–252.

* cited by examiner

Primary Examiner—Jimmy H. Nguyen
(74) Attorney, Agent, or Firm—Oliff & Berridge, PLC

(57) ABSTRACT

An image display medium capable of displaying an image showing little change of the image density, and also little change of the image density uniformity, and being stable in density contrast, even when repeatedly rewritten over a long period, and an image formation apparatus are provided. The image display medium includes a pair of substrates disposed opposing to each other; and particle groups including at least two types of particles sealed in a space between the pair of the substrates, at least one type thereof having a positively chargeable property, and at least one of others having a negatively chargeable property, and the positively and negatively chargeable types of particles being different colors. The value of a coefficient of variation in each particle size distribution of both the positively and negatively chargeable types of particles is approximately not more than 15%.

12 Claims, 2 Drawing Sheets

IMAGE DISPLAY MEDIUM AND IMAGE FORMATION APPARATUS

BACKGROUND OF THE INVENTION

1. Field of the Invention

The present invention relates to a repeatedly rewritable image display medium using particles, and an image formation apparatus.

2. Description of the Related Art

Conventionally, as repeatedly rewritable image display media, there are proposed display techniques such as Twisting Ball Display (two-colored rotating-particle display), electrophoresis, magnetophoresis, thermal rewritable medium, and liquid crystal having a memory property. Although such display technologies are excellent in memory property of an image, they are not capable of providing a paper-white display on a screen, thereby causing a problem of low density contrast.

On the other hand, as the display technique using a toner for overcoming the foregoing problem, there is proposed the following display technique. Namely, a conductive colored toner and white particles are sealed between opposing electrode substrates. Thus, charges are injected to the conductive colored toner through a charge transport layer disposed on the inner surface of the electrode substrate on the non-display side. The charge-injected conductive colored toner is then moved to the electrode substrate on the display side, situated opposing to the electrode substrate on the non-display side in response to the electric field applied between both the electrode substrates, and adheres to the inner side of the electrode substrate on the display side to provide image display by contrast between the conductive colored toner and the white particles (Japan Hardcopy' 99 Paper Collection, pp.249–252). With this display technique, the whole image display medium is constituted of a solid, so that the display can be advantageously switched between white and black (colors) 100% in principle. However, the foregoing technique has the following problem. That is, there occur a conductive colored toner in no contact with the charge transport layer disposed on the inner surface of the electrode of the non-display substrate, and a conductive colored toner isolated from other conductive colored toners. These conductive colored toners are not injected with charges, and hence they are not moved in response to the electric field. Accordingly, they are randomly present between both the electrode substrates, resulting in a reduction in density contrast.

The present inventors have proposed an image display medium using particles, excellent in density contrast, which includes a pair of substrates, and plural types of particle groups sealed movably in response to the applied electric field between the substrates, and having different colors and charging characteristics (Japanese Patent Application No. 2000-165138). According to this proposal, it is possible to obtain a high whiteness degree and density contrast. With the constitution of the particles in this proposal, the white density, black density, and density contrast are excellent at an initial stage, but when rewriting is performed repeatedly for a long period, the image density may be reduced to reduce the density contrast, or the uniformity of the image may be reduced to cause image irregularity.

SUMMARY OF THE INVENTION

The present invention has been made in view of the above circumstances and provides an image display medium which is capable of displaying an image which shows little change in image density, and little change in density uniformity, and has a stable density contrast even when rewriting is carried out repeatedly over a long period, and an image formation apparatus.

A close study has proved that the foregoing problem is caused by destabilization of the charging amount and broadening of charge distribution (charging distribution) due to frictional charging between particles. Then, the inventors have found that it is effective to appropriately set the value of the coefficient of variation in the particle size distribution of particles to be used in order to stabilize the charging amount due to frictional charging between particles. Consequently, they have completed the present invention.

According to an aspect of the present invention, an image display medium has a pair of substrates disposed opposing to each other; and particle groups including at least two types of particles sealed in a space between the pair of the substrates, at least one type thereof having a positively chargeable property, and at least one of others having a negatively chargeable property, and the positively and negatively chargeable types of particles being of different colors. The value of a coefficient of variation in each particle size distribution of both the positively and negatively chargeable types of particles is approximately not more than 15%.

In the present invention, the positively and negatively chargeable types of particles may be of different colors, and that the particle size distributions thereof are respectively sharp distributions. A difference in color therebetween provides a density contrast between the image area made up of the positively chargeable particle group and the image area made up of the negatively chargeable particle group. Further, by sharpening the particle size distributions of both the positively and negatively chargeable types of particles, it is possible to improve the speed of the responsibility among particles between the pair of the substrates. Still further, since the collision efficiency between particles is improved, it becomes possible to stabilize frictional charging and make the charging distribution narrow.

In the image display medium of the present invention, it is desirable that one type of the positively and negatively chargeable types of particles are of white color. By setting at least one type of particles to be of white color, it is possible to improve the tinting strength of the particles, and the density contrast. Further, it is desirable that the white color particles contain a coloring material and that the coloring material is titanium oxide. By using titanium oxide as the coloring material, it is possible to increase the hiding power in the range of visible light wavelengths, and still further improve the density contrast.

In the image display medium of the present invention, it is desirable that at least one of the positively chargeable type of particles and the negatively chargeable type of particles is the type particles obtained by moving an oil phase in which components making up the particles have been dissolved and/or dispersed to an aqueous phase through a film having pores for granulation.

The particles manufactured in the foregoing manner are obtained from granulation process by moving the oil phase to the aqueous phase through the film having pores, and thereby forming oil droplets. Therefore, the diameter of each particle is controlled by the diameter of each pore of the film. As a result, it is possible to sharpen the particle size distribution of the obtained particles only by controlling the pores of the film. Accordingly, it is possible to manufacture the particles with the particle size distribution specified in the present invention with ease, so that the effect of the invention can be achieved with ease and at a high level.

According to another aspect of the present invention, an image formation apparatus which forms an image on the image display medium of the present invention described above has an electric field generation part which generates an electric field corresponding to an image between the pair of the substrates.

BRIEF DESCRIPTION OF THE DRAWINGS

Preferred embodiments of the present invention will be described in detail based on the followings, wherein.

DETAILED DESCRIPTION OF THE PREFERRED EMBODIMENTS

Figure 1:
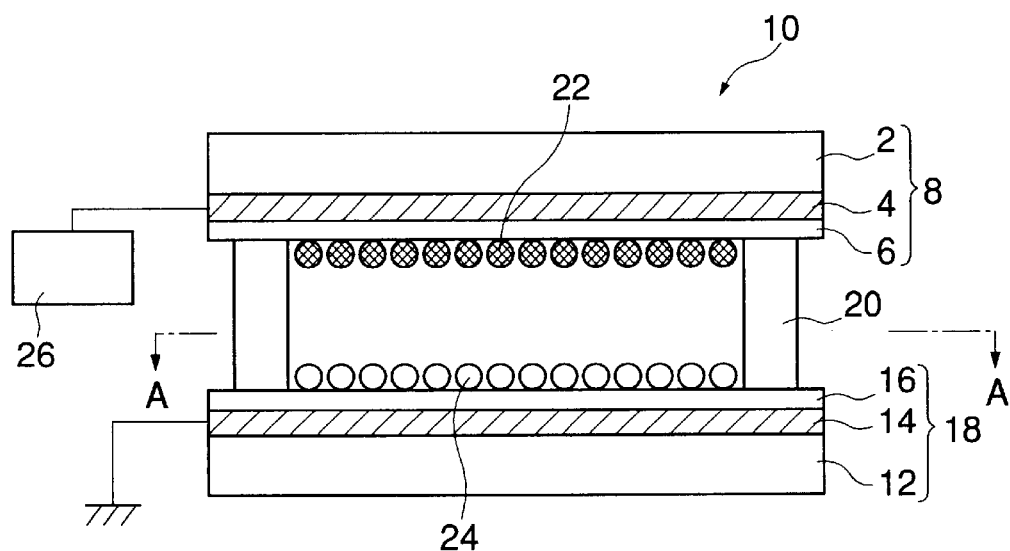
FIG. 1 schematically illustrates a configuration of an image formation apparatus of the present invention using an image display medium of the present invention.

Below, the present invention will be described in details. At least two or more types of particles to be sealed in the space between a pair of substrates disposed opposing to each other are mixed in the proportions of respective prescribed amounts with stirring in a container for stirring. It is supposed as follows. That is, frictional charging between particles, and between particles and the inner wall of the container are effected in the process of mechanical stirring and mixing, so that respective particles are charged. Thereafter, the mixed particles are sealed in the space between the pair of the substrates so as to achieve a prescribed volume filling ratio. The sealed particles are moved back and forth between the substrates in response to an electric field by polarity switching of a DC voltage applied between the pair of the substrates, or by application of an AC voltage (initializing step). It is supposed that respective particles are also frictionally charged by collision between particles and between particles and each substrate surface layer in the process of the initializing step. Further, by the initializing step, it is possible to obtain a desired frictional charging amount.

By the frictional charging, out of the particles, at least one type of particles are positively charged (below, the particle which is positively charged is referred to as a first particle), and at least another type of particles are negatively charged (below, the particle which is negatively charged is referred to as a second particle). Respective particles try to adhere to each other, and aggregate by the Coulomb attractive force between the first particles and the second particles. However, the particles are separated from each other in response to the direction of the electric field finally applied in the initializing step, and adhere to their respective ones of the substrates.

Then, by applying an electric field thereto in accordance with an image signal, the first particles and the second particles are separated from each other, and moved in response to the electric field to respectively adhere to different substrates. Namely, it is supposed as follows. That is, if, with an electric field applied from outside, the electrostatic force acting on individual charged particle surpasses the Coulomb force between particles, the imaging force or the force resulting from the contact potential difference between the particle and the substrate surface, the particles are separated from each other, and they are moved to, and adhere to their respective substrates on opposite sides.

The particles which have adhered to the substrate surface are supposed to adhere to and be fixed on the substrate surface by the image force and the van der Waals force occurring between the substrate surface and themselves. Herein, when the charging property of each particle is high, the cohesive force between particles becomes high, and hence separation thereof becomes difficult. Further, the particle having a high charging property has a high adhesion with the substrate surface, and hence there is a higher probability that it is not moved in response to the applied electric field to be fixed on the substrate surface. When the agglomerate particles having a high charging property are separated from each other, discharge may occur locally, and thus it is supposed that the charging property of each particle becomes instable.

On the other hand, when the charging property of each particle is low, and there is almost no difference in charging property between the first particle and the second particle, respective types of particles are hardly separated from each other by the electrostatic force due to the external electric field. Thus, the particles are kept in a lightly agglomerated state, and therefore they cannot provide display.

The foregoing description indicates as follows. That is, in order that particles of different polarities may be separated from each other in response to the external electric field, it is important that respective particles have appropriate charged amounts and frictional charging characteristics that there are less reverse polarity chargeable particles.

Then, when the particles are moved repeatedly by switching the polarity of the electric field, the charging property of each particle is increased due to the friction between the particles, and the friction between the particles and the substrate surface, so that agglomeration of particles may occur, or there may be observed the phenomenon that the particles are fixed on the substrate surface, and become inseparable therefrom. In such a case, the charged amount of the particle group causing image irregularity covers a broad range from a high value to a low value. Therefore, in order to keep the initial operational condition, it is supposed to be important that the charging characteristics of the particles show a small change.

As the technique for charging control, there is a method in which charging is controlled by the presence of inorganic oxide fine particles, or fine particles such as resin fine particles on the particle surface. However, this method entails the following problems. For example, collision or rubbing between the first particle and the second particle causes the fine particles to shift to the opponent particle (the first particle or the second particle), and/or to shift to a transparent electrode substrate, resulting in a reduction in charged amount, and causes a change in powder fluidity, resulting in a reduction in display contrast.

Such avoidance of the change in positional relationship between the surfaces of the first particles and the second particles and the fine particles is important for maintaining the charging properties, and maintaining the fluidity of the first particles and the second particles.

In the present invention, the foregoing problem is overcome by adjusting the value of each coefficient of variation in both the particle size distributions of the first particles and the second particles at not more than 15%. Namely, it has been revealed that respectively sharpening both the particle size distributions of the first particles and the second particles is effective for the improvement of the powder fluidity, the uniformalization of the frictional charging distribution associated therewith, stability, and the separation rate of differently charged particles and the density contrast in display.

Incidentally, in the above description, the expression has been used assuming that there are one type of the first particles which are positively charged and one type of the second particles which are negatively charged. However, there occurs no problem even if there is respectively only one type, or two or more types, respectively. Even for two or more types, the effect of the invention is exerted by the same functional mechanism as described above.

The particle in the present invention (below, the wording "particle in the present invention" generically refers to both the positively and negatively chargeable types of particles) is made up of at least, a coloring material and a resin. Further, if required, it may contain a charge control agent, and such a constitution is also acceptable that the coloring material also serves as a charge control agent.

As the coloring materials to be used in the present invention, mention may be made of the following ones.

Examples of the black color type coloring material include carbon black, titanium black, and, magnetic powder, and in addition, oil black, organic and inorganic dye or pigment type black coloring materials.

Examples of the white color type coloring material include white pigments such as rutile type titanium dioxide, anatase type titanium dioxide, zinc white, white lead, zinc sulfide, aluminum oxide, silicon oxide, and zirconium oxide.

In addition, examples of the chromatic color type coloring material include phthalocyanine type, quinacridone type, azo type, condensation type, and insoluble lake pigments, and inorganic oxide type dyes and pigments. Specifically, typical examples thereof include aniline blue, chalcoyl blue, chrome yellow, ultramarine blue, DuPont oil red, quinoline yellow, methylene blue chloride, phthalocyanine blue, malachite green oxalate, lamp black, rose bengal, C.I. Pigment Red 48:1, C.I. Pigment Red 122, C.I. Pigment Red 57:1, C.I. Pigment Yellow 97, C.I. Pigment Yellow 180, C.I. Pigment Yellow 185, C.I. Pigment Blue 15:1, and C.I. Pigment Blue 15:3.

One type of the positively and negatively chargeable types of particles in the present invention are preferably white. In other words, the coloring material in one type of the positively and negatively chargeable types of particles in the present invention is preferably the white color type coloring material. By setting one type of particles to be white, it is possible to improve the tinting strength and the density contrast of the other type of particles. In this case, the coloring material for making one type of the particles white is preferably titanium oxide. By using titanium oxide as the coloring material, it is possible to increase the hiding power in the range of wavelengths of visible light, resulting in a further improved density contrast. The particularly preferred coloring material is rutile type titanium dioxide.

As the structure of the coloring material also serving as a charge control agent, mention may be made of the ones each having an electron attracting group or an electron donating group, and metal complexes. Specific examples thereof include C.I. Pigment Violet 1, C.I. Pigment Violet 3, C.I. Pigment Black 1, and C.I. Pigment Violet 23.

The amount of the coloring material to be added is preferably in the range of approximately from 1 to 60% by mass, and more preferably in the range of approximately from 5 to 50% by mass based on the total amount of the particles, wherein the specific gravity of the coloring material is 1.

Examples of the resin making up the particle in the present invention include polyvinyl resins such as polyolefin, polystyrene, acrylic resin, polyacrylonitrile, polyvinyl acetate, polyvinyl alcohol, vinyl chloride, and polyvinyl butyral; vinyl chloride-vinyl acetate copolymer; styrene-acrylic acid copolymer; straight silicon resin having organosiloxane bonds and modified products thereof; fluorine resins such as polytetrafluoroethylene, polyvinyl fluoride, and polyvinylidene fluoride; polyester, polyurethane, and polycarbonate; amino resin; and epoxy resin. These resins may be used singly, or in mixture of plural thereof. More preferably, whether these resins are used singly, or in mixture of plural thereof is selected according to the solubility in the aqueous phase. When plural resins are used in mixture, an organic solvent for dissolving a resin having a low solubility in the aqueous phase, such as methylene chloride or toluene is preferably used. These resins may also be crosslinked. Further, it is possible to use a binder resin known in the art as the main component for an electrophotographic toner for the particle without problems. Particularly, a resin containing a crosslinkable component is preferably used.

A charge control agent may be added to the particle in the present invention for controlling the charging property, if required. The charge control agent usable may be the known ones used for the materials for an electrophotographic toner. Examples thereof include quaternary ammonium salts such as cetylpyridyl chloride, BONTRON P-51, BONTRON P-53, BONTRON E-84, and BONTRON E-81 (all manufactured by Orient Chemical Industries, Ltd.), and COPY CHARGE PSY VP2038 (manufactured by Clariant Japan KK), salicyclic acid type metal complexes, phenolic condensation products, tetraphenyl compounds, oxidized metal fine particles, and oxidized metal fine particles surface-treated by various coupling agents.

Two or more types of particles in the present invention are required to be adjusted so that at least one type of them has a positively chargeable property, and at least another type of them has a negatively chargeable property. When different types of particles are collided with each other, or rubbed against each other to be charged, one type of particles are positively charged, and the other type of particles are negatively charged according to their positional relationship relative to each other in the electrification line. In the present invention, for example, it is possible to appropriately adjust the positions in the electrification line by properly selecting the charge control agent.

It is desirable that the charge control agent to be used in the present invention is colorless, has a low tinting strength, or has a similar color to the color of the whole particles in which it is to be included. By using a charge control agent which is colorless, has a low tinting strength, or has a similar color to the color of the whole particles in which it is to be included (in other words, a similar color to the color of the coloring material contained in each of the particles), it is possible to reduce the impact of the selected particles on the hue.

The term "colorless" herein used denotes having no color, and the wording "low tinting strength" denotes that the effect exerted on the color of the whole particles in which the charge control agent is to be included is small. Further, the wording "a similar color to the color of the whole particles in which it is to be included" denotes the color which has a hue itself, but is the same color as, or the hue close to the color of the whole particles in which it is to be included, and as a result, hardly has an effect on the color of the whole particles in which it is to be included. For the particles containing, for example, white pigment as the coloring material, a white charge control agent or the like falls under the category of "a similar color to the color of the whole particles in which it is to be included". In any case, a charge control agent may have any color so long as the resultant particle containing the charge control agent has a desired color regardless of "being colorless", "having a low tinting strength", or "having a similar color to the color of the whole particles in which it is to be included".

The charge control agent usable in the present invention is dispersed in the particle as a unit having a size of approximately not more than 5 μm, and preferably approximately not more than 1 μm in volume mean particle diameter. Alternatively, the charge control agent may also be present in a mixed state in the particle.

For the particle containing the charge control agent in the present invention, the amount of the charge control agent to be added is in the range of preferably approximately from 0.1 to 10% by mass, and more preferably approximately from 0.5 to 5% by mass based on the total amount of the particles.

It is preferable that the particle in the present invention further contains a resistance modifier. By using the resistance modifier, it becomes possible to accelerate charge exchange between particles, making it possible to achieve early stabilization of the apparatus. The resistance modifier herein used denotes a conductive fine powder. Particularly, it is preferably a conductive fine powder which moderately effects exchange of charge, and leak of charge. The presence of the resistance modifier therein allows the avoidance of an increase in charge amount of particles due to friction between the particles or the friction between the particles and the substrate surface over a long period, i.e., so-called charge up.

As such a resistance modifier, mention may be made of an inorganic fine powder having a volume resistivity of approximately $1\times10^6$ Ωcm or less, and preferably approximately $1\times10^4$ Ωcm or less. Specific examples thereof include tin oxide, zinc oxide, iron oxide, and fine particles coated with various conductive oxides (ex., titanium oxide coated with tin oxide). It is preferable that the resistance modifier in the present invention is colorless, has a low tinting strength, or has a similar color to the color of the whole particles in which it is to be included. The meaning of each wording is the same as described in the paragraph on the charge control agent. The resistance modifier may be added in any amount with no problems so long as the color of the particle is not affected. Specifically, it is preferably added in an amount of approximately from 0.1% by mass to 10% by mass based on the total amount of the particles.

The particles (both of positively and negatively chargeable types of particles) in the present invention are characterized in that the value of the coefficient of variation in each particle size distribution is approximately not more than 15%.

Herein, it is possible to determine the coefficient of variation in the particle size distribution by the following measurement.

It is possible to determine the coefficient of variation H in the particle size distribution by performing a particle size measurement using, for example, a measuring apparatus MULTISIZER II manufactured by Beckman Coulter, Inc. The coefficient of variation H is calculated from the particle size (A) of the volume arithmetic mean diameter (arithmetic mean diameter in % by volume), and the standard deviation (B) of the particle size (A) by the following equation (1):

$$H=(B/A)\times 100 \qquad (1)$$

The coefficient of variation H denotes the size of the distribution width of the particle size distribution. Namely, a smaller coefficient of variation H indicates a sharper particle size distribution having a narrower distribution width.

In the present invention, the coefficient of variation H is essentially approximately not more than 15%, and preferably approximately not more than 10%, and it more preferably indicates monodispersion.

As for the particle size of the positively and negatively chargeable two color types of particles (ex., particles of chromatic colors such as white particles and blue particles), it is preferable that both types of particles are almost equal in particle diameter and distribution. By setting both types of particles to be almost equal in particle diameter and distribution, there is avoided such an adhered state as observed in a so-called two-component developer in which a large-diameter particle is surrounded by small-diameter particles. Consequently, high white color density and chromatic color density are obtained. If there is a large difference in particle diameter between both types of particles, small-diameter particles adhere to the periphery of a large-diameter particle, undesirably resulting in a reduction of the original color density of the large-diameter particle.

Further, the color contrast also varies according to the mixing ratios of the two color types of particles. Therefore, when both types of particles are almost equal in particle diameter, such mixing ratios are desirable that the numbers of the two color types of particles are equal or close to each other. If the numbers of the two color types of particles are largely different from each other, the color of the type of particles present in a larger proportion is intensified. However, this does not apply to the case where a contrast is required to be provided by display in dark tone and display in pale tone both in the same color, or where display is required to be provided in a color formed by mixing two color types of particles.

The particle diameter of the particles in the present invention cannot be determined sweepingly, but it is preferably approximately from 1 to 100 μm, and more preferably approximately from 3 to 30 μm for obtaining a good image. In particular, these particles are preferably dispersed in monodispersed state.

The particle in the present invention desirably has a shape close to a perfect sphere. If it is a particle close to a perfect sphere, the contact between the particles is achieved through nearly point contact, and the contact between the particles and the inner surface of the substrate is also achieved through nearly point contact. Consequently, the adhesion between the particles, and between the particles and the substrate inner surface based on van der Waals force is reduced. Therefore, even if the substrate inner surface is a dielectric substance, charged particles are considered to be able to smoothly move within the substrates in response to an electric field.

As the manufacturing methods of the particles in the present invention, mention may be made of wet manufacturing methods such as suspension polymerization, emulsion polymerization, and dispersion polymerization, known as the manufacturing methods of an electrophotographic toner, and a conventional grinding classification method. The particles obtained from the wet manufacturing method are spherical particles whereas the particles obtained from the grinding classification method are amorphous particles. Accordingly, in this case, these particles are desirably subjected to heat treatment for making the shapes of these particles uniform.

The particle size distribution can be aligned by being adjusted by a classification operation. Examples of the classification apparatus for use in the classification operation include various vibratory sieves, ultrasonic sieve, air sieve, wet sieve, a rotary classifier based on the principle of a centrifugal force, and pneumatic classifier. These may be used singly or in combination thereof to adjust the particle size distribution to a desired one. Out of these, when the particle size distribution is adjusted with precision, the wet sieve is preferably used.

The most suitable manufacturing method of the particles in the present invention is as follows. An oil phase in which the components making up the particle have been dissolved and/or dispersed is moved to an aqueous phase through a film having pores for granulation. According to this method, it is possible to manufacture particles having a sharp particle diameter distribution, and suitable as display particles with efficiency.

Namely, since the granulation has been carried out by moving the oil phase to the aqueous phase through a film having pores, the diameter of each particle is controlled by the diameter of each pore of the film. As a result, it is possible to sharpen the particle size distribution of the obtainable particles only by controlling the pores of the film.

The manufacturing method will be described in detail below.

The components making up the particle in the present invention, i.e., a resin and a coloring material, and a charge control agent, a resistance modifier, a polymerization initiator, and the like, to be added if required, are dissolved and/or dispersed in a monomer, an organic solvent, or the like to prepare a composition serving as an oil phase. On the other hand, a water system material (water, a mixture of water and a surfactant, or the like) serving as an aqueous phase is prepared. The oil phase made of the composition serving as the oil phase and the aqueous phase made of the water system material serving as the aqueous phase are partitioned by a film having pores. Then, the composition of the oil phase is moved to the aqueous phase through the film having pores. Consequently, oil droplets are formed in accordance with the diameter of each pore. Accordingly, the particles thus granulated have a very narrow particle size distribution. Herein, by adjusting the size of the diameter of the pore, it is possible to adjust the size of each particle obtainable with ease.

The usable films having pores can be manufactured by subjecting the ones made of materials such as various ceramics, metals, polymers, and glasses to etching, laser, compaction of various material fine particles, molding, heat treatment, or the like for pore diameter adjustment. In particular, in the present invention, porous glass is preferably used.

The porous glass used as the film having pores is the glass having such pores that are adjusted within a narrow range. It has a chemical composition containing, as main components, a silicic acid, a boric acid, and alumina. This glass is called Micro Porous Glass (MPG) or Shirasu Porous Glass (SPG). Glass containing a silicic acid, a boric acid, alumina, and the like has the property of separating into the phase made up of a boric acid and an alkali which are likely to be dissolved in an acid when subjected to heat treatment at several hundred degrees, and the other phase. The porous glass is the glass which has been made porous by utilizing such a property, and washing out a boric acid and an alkali from the glass which has undergone phase separation with an acid. When granulation is carried out by using the porous glass having pores, the porous glass is preferably in the shape of a tube or a plate.

Further, in the aqueous phase, there are preferably used, if required, polymer dispersants such as known anionic, nonionic, and cationic surfactants, polyvinyl alcohol, polyvinyl pyrrolidone, gelatin, methyl cellulose, polyacrylic acid, starch, and casein, and fine particle inorganic compounds of silicon oxide, calcium carbonate, aluminum oxide, and the like for stabilizing the oil droplets obtained.

The composition of the oil phase may be moved to the aqueous phase through a film having pores in the following manner. That is, the composition may be introduced into the aqueous phase by suction under reduced pressure, or it may be introduced into the aqueous phase by forcing under pressure. Incidentally, when a monomer is used for the composition serving as the oil phase, the oil droplets are manufactured, and then the polymerization reaction is effected.

The particles thus formed are well washed to remove a surfactant, a polymer dispersant, inorganic salts, and the like therefrom. Further, if required, the particle size is adjusted, followed by drying.

The substrates in the present invention are a pair of ones disposed opposing to each other, and the particles are sealed in a space between the pair of the substrates.

The substrates in the present invention are plate-like members having conductivity (conductive substrates). In order for the substrates to have a function as an image display medium, at least one of the pair of the substrates is required to be a transparent conductive substrate. In this case, the transparent conductive substrate serves as a display substrate.

The conductive substrate to be used in the present invention may be conductive itself, or the one obtained by subjecting the insulating support surface to a conductive treatment. Further, whether it is a crystal, or amorphous does not matter. As the conductive substrate which is conductive itself, mention may be made of metals such as aluminum, stainless steel, nickel, and chromium, or alloy crystals thereof, and semiconductors such as Si, GaAs, GaP, GaN, SiC, and ZnO.

Examples of the insulating support include a polymer film, glass, quartz, and ceramics. The conductive treatment of the insulating support can be accomplished by subjecting the metals mentioned as the specific examples of the conductive substrate which is conductive itself, or gold, silver, copper, or the like to film formation by a deposition method, a sputtering method, an ion plating method, or the like.

The transparent conductive substrate usable is a conductive substrate so configured that a transparent electrode is formed on one side of an insulating transparent support, or a transparent support having conductivity itself. Examples of the transparent support having conductivity itself include transparent conductive materials such as ITO, zinc oxide, tin oxide, lead oxide, indium oxide, and copper iodide.

Examples of the insulating transparent support usable include films or plate-like products of transparent inorganic materials such as glass, quartz, sapphire, MgO, LiF, and $CaF_2$, and transparent organic resins such as fluorine resins, polyester, polycarbonate, polyethylene, polyethylene terephthalate, and epoxy, and further an optical fiber, SELFOC optical plate, and the like.

As the transparent electrode provided on one side of the transparent support, there are used the one formed by subjecting a transparent conductive material such as ITO, zinc oxide, tin oxide, lead oxide, indium oxide, or copper iodide to a process of deposition, ion plating, sputtering, or the like, or the one obtained by forming a metal such as Al, Ni, or Au to such a small thickness as to be semitransparent by deposition or sputtering.

In another preferred embodiment, in these substrates, their respective opposing surfaces affect the charged polarity of the particle, and hence protective layers having appropriate surface conditions are respectively provided thereon. The protective layer can be selected from the viewpoints of, mainly, the adhesion to the substrate, transparency, and electrification line, and further low susceptibility to surface contamination. Specific examples of the material for the protective layer include polycarbonate resins, vinyl silicone resins, and fluorine group-containing resins. As for the selection of the resin, there is selected the resin having a small difference in constitution from the main monomer of the particle to be used, and in frictional charging characteristic from the particles.

Below, the embodiment of an image formation apparatus of the present invention using an image display medium of the present invention will be described in details by reference to drawings.

Figure 2:
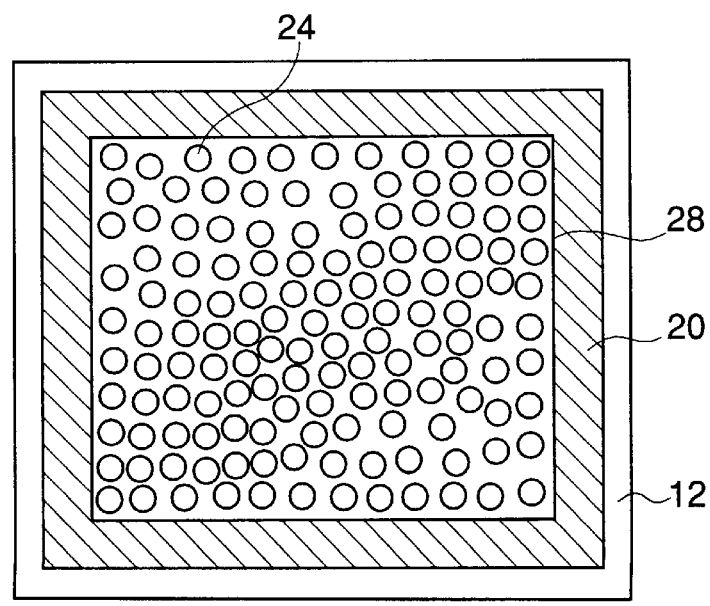
FIG. 2 is a cross-sectional view taken on line A—A of FIG. 1.

FIG. 1 schematically illustrates a configuration of an image formation apparatus according to the embodiment of, and FIG. 2 is a cross-sectional view taken on line A—A of FIG. 1

The image formation apparatus in accordance with the embodiment includes an image display medium 10, and a voltage generation part 26 as shown in FIG. 1. The image display medium 10 is the image display medium of the present invention as described above, and it is made up of a display substrate 8, blue particles 22, white particles 24, a non-display substrate 18, and a spacer 20. The display substrate 8 is so configured that a transparent electrode 4 and a protective layer 6 are successively stacked on one side of a transparent support 2. Similarly, the non-display substrate 18 is so configured that an electrode 14 and a protective layer 16 are successively stacked on one side of a support 12. Further, the transparent electrode 4 of the display substrate 8 is connected to the voltage generation part 26, and the electrode 14 of the non-display substrate 18 is grounded.

Then, the image display medium 10 will be described in detail. For the transparent support 2 and the transparent electrode 4, and the support 12 and the electrode 14 respectively constituting the outsides of the image display medium 10, for example, 7059 glass plates each with a 50 mm×50 mm×1.1 mm transparent electrode ITO are used. It is noted that the support 12 and the electrode 14 on the non-display substrate 18 side is not necessarily required to be transparent. The inner surfaces of the glass substrates to be in contact with the particles (the surfaces of the transparent electrode 4 and the electrode 14) are coated with a polycarbonate resin (PC-Z) in a thickness of 5 μm to form the protective layers 6 and 16, respectively.

The spacer 20 is so formed that a 15 mm×15 mm square cut-out portion 28 is disposed at the central portion of a 40 mm×40 mm×0.3 mm silicone rubber plate for ensuring the formation of a space upon setting. The spacer 20 is constituted by setting the silicone rubber plate provided with the cut-out portion 28 on the surface on which the electrode 14 and the protective layer 16 of the non-display substrate 18 are formed.

Approximately 15 mg of mixed particles made up of the blue particles 22 and the white particles 24 are sieved out through a screen into the space formed by the cut-out portion 28 of the spacer 20. Thereafter, the display substrate 8 is bonded to the spacer 20 such that the surface on which the transparent electrode 4 and the protective layer 6 are formed opposes to the non-display substrate 18. The portion between the substrate 8 and the substrate 18 is kept under pressure by a double clip, so that the spacer 20 and both the substrates 8 and 18 are bonded to form the image display apparatus 10.

When a DC voltage of 150 V is applied to the transparent electrode 4 of the display substrate 8 of the image display medium 10 by the voltage generation part 26, a part of the negatively charged white particles 24 present on the non-display substrate 18 side begin to move toward the display substrate 8 by the action of an electric field. Then, when a DC voltage of 500 V is applied thereon, a large number of white particles 24 move toward the display substrate 8, so that the display density is almost saturated. At this time, positively charged blue particles 22 move toward the non-display substrate 18. Thereafter, even when the applied voltage by the voltage generation part 26 is set at 0 V, the white particles 24 adhering to the display substrate 8 do not move, so that the display density shows no change.

Thus, the image formation apparatus of the present invention using the image display medium of the present invention was described by way of the embodiment, which should not be construed as limiting the scope of the present invention. For example, as the colors of the particles, mention was made of the ones of white color and blue color. However, a combination of various colors may be adopted, and as already described, one type is preferably white. Further, the size of each member is also a mere example, and hence the members of various sizes are selected according to the intended purpose.

Incidentally, an image display apparatus made up of plural image display media can also be implemented in the following manner. That is, plural cells are arranged in plane form, wherein each of the cells is the unit having the constitution of the image display medium of the present invention (or, the space between the opposing substrates is divided in plane form to form cells). By achieving desired numbers of cells in rows and columns, it is possible to manufacture a large-screen image formation apparatus having a desired resolution.

EXAMPLES

Below, the present invention will be described in more details by way of examples.

In each of the following examples and comparative examples, there was used the image formation medium or image display apparatus of the configuration of FIGS. 1 and 2 explained in the paragraph of "Embodiments of image formation apparatus of the present invention" described above. Then, the effect of the invention was to be confirmed by changing the constitutions of the white particles and the blue particles. In this step, the size of each member, materials, and the like were set to be the same as the ones described in the paragraph of "Embodiments of image formation apparatus of the present invention" above.

Manufacturing of Particles

The white particles and the blue particles were manufactured in the following manners, respectively.

(White particle-1)
a) Preparation of Dispersion A
  Styrene monomer: 53 parts by weight
  Titanium oxide (TIPAQUE CR63: manufactured by Ishihara Sangyo Kaisha Ltd.): 30 parts by weight Charge control agent (COPY CHARGE PSY VP2038: manufactured by Clariant Japan KK): 1 part by weight The mixture having the composition described above was subjected to ball mill grinding using a 10-mm-dia zirconia ball for 20 hours to obtain a dispersion A.

b) Preparation of Calcium Carbonate Dispersion B

Calcium carbonate: 30 parts by weight

Water: 60 parts by weight

The mixture having the composition described above was subjected to fine grinding in a ball mill in the same manner as in the manufacturing of the dispersion A to obtain a calcium carbonate dispersion B.

c) Preparation of Mixed Solution C

2% CELLOGEN aqueous solution: 4.3 g

Calcium carbonate dispersion B: 8.5 g

20% saline solution: 50 g

The mixture having the composition described above was subjected to degassing by means of an ultrasonic dispersing device for 10 minutes, and then stirred by an emulsifier to obtain a mixed solution C.

d) Manufacturing of Particles

Figure 3:
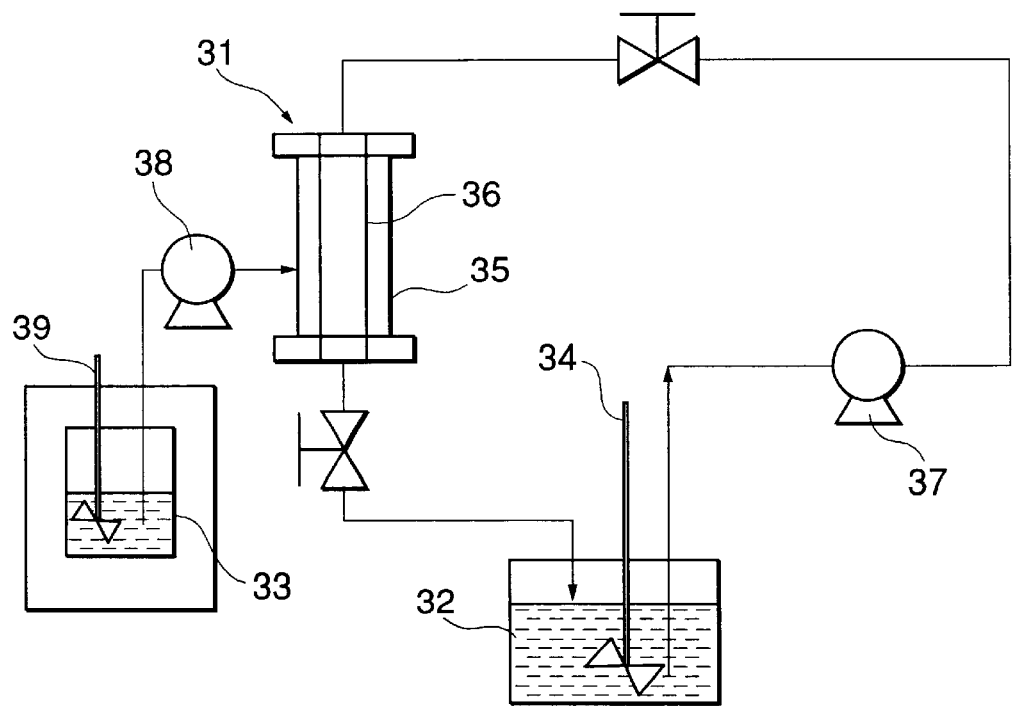
FIG. 3 schematically illustrates a configuration of an emulsifying and dispersing apparatus used for the manufacturing of particles in Examples.

Manufacturing of particles was accomplished by means of an emulsifying and dispersing apparatus shown in FIG. 3. The emulsifying and dispersing apparatus is made up of a film emulsifying module 31 including a porous glass tube 36 (pore diameter 2.5 $\mu$m, 10 mm$\phi$×120 mm, manufactured by ISE CHEMICALS Corp.) and an outer cylinder 35, and a unit for feeding the composition of an oil phase and a water system material of an aqueous phase to the film emulsifying module 31. Namely, the aqueous phase is formed in the inside of the porous glass tube 36, and the oil phase is formed in the space between the porous glass tube 36 and the outer cylinder 35. Thus, the oil phase and the aqueous phase are partitioned by the porous glass tube 36 which is a film having pores.

First, 35 g of the dispersion A, 1 g of divinylbenzene, and 0.35 g of a polymerization initiator AIBN (azoisobutyronitrile) were weighed out, and sufficiently mixed. The resulting mixture was subjected to degassing by means of an ultrasonic dispersing device for 10 minutes to obtain a composition serving as an oil phase. The composition was charged into an oil phase container 33, and stirred by means of a stirrer 39.

The mixed solution C (aqueous phase) was charged into a dispersing solvent container 32, and circulated through the inside of the porous glass tube 36 of the film emulsifying module 31 by means of a liquid feed pump 37 with stirring by means of a stirrer 34.

The composition accommodated in the oil phase container 33 is forced into the space between the porous glass tube 36 and the outer cylinder 35 in a prescribed amount by a quantitative liquid feed pump 38. As a result, the composition of the oil phase which has permeated through the porous glass tube 36 moved into the mixed solution C of the aqueous phase circulating through the inside of the porous glass tube 36 to form oil droplets. Finally, the oil droplets were supplied into the dispersing solvent container 32 to prepare the dispersion of the particles.

The dispersion thus formed was charged into a bottle, and a silicone stopper was then put on the bottle. The dispersion was sufficiently subjected to degassing under reduced pressure. Thereafter, a nitrogen gas was sealed therein. Then, the reaction was performed at 70° C. for 10 hours to manufacture particles. After cooling, the resulting particles were take out, and calcium carbonate was decomposed with an excessive amount of a 3 mol/l hydrochloric acid, followed by filtration. Thereafter, the particles were washed with a sufficient amount of distilled water several times, and dried by means of a vacuum dryer, followed by cracking. Then, the resulting particles were allowed to pass through a microsieve SMS-75A type (sieve with openings: 12.5 $\mu$m and 16 $\mu$m) to unify the particle size. Consequently, white particles-1 with a volume arithmetic mean diameter equal to 14.0 $\mu$m, and a coefficient of variation H equal to 10% were obtained.

(Blue Particle-1)

In the manufacturing method described in the paragraphs of (White particle-1), the following step was carried out in place of the step of "a) Preparation of dispersion A" to obtain a dispersion A'. The subsequent steps in (White particle-1) were carried out by using the dispersion A' obtained. Consequently, blue particles-1 with a volume arithmetic mean diameter equal to 13.7 $\mu$m, and a coefficient of variation H equal to 12% were obtained.

a) Preparation of Dispersion A'

Styrene monomer: 90 parts by weight

Blue pigment (C.I. Pigment Blue 15:3, SANYO CYANINE BLUE KRO:

Sanyo Color Works, Ltd.): 10 parts by weight

The mixture having the composition described above was subjected to ball mill grinding using a 10-mm-dia zirconia ball for 20 hours to obtain a dispersion A'.

(White Particle-2)

White particles-2 with a volume arithmetic mean diameter equal to 13.1 $\mu$m, and a coefficient of variation H equal to 14% were obtained in the same manner as with (White particle-1), except that the following operation was carried out in place of the particle size adjustment operation (operation of unifying the particle size by means of a micro type sonic sifter) in the final stage in the process of "d) Manufacturing of particles" in (White particle-1).

Particle Size Adjustment Operation

By using a nylon sieve with openings of 10 $\mu$m and 15 $\mu$m, a sieving operation was carried out in a water dispersed system, while applying an ultrasonic wave thereto, and adding water thereto several times. Thus, the particles which had passed through 15 $\mu$m openings, but had not passed through 10 $\mu$m openings to be left were collected to unify the particle size. The particles thus collected were subjected to vacuum drying, and cracking to manufacture white particles-2.

(Blue Particle-2)

Blue particles-2 with a volume arithmetic mean diameter equal to 12.8 $\mu$m, and a coefficient of variation H equal to 14.2% were obtained in the same manner as with (White particle-1), except for the following steps. That is, the step of "a) Preparation of dispersion A'" in (Blue particle-1) was carried out in place of the step of "a) Preparation of dispersion A" in (White particle-1) to obtain a dispersion A'. The subsequent steps in (White particle-1) were carried out by using the dispersion A' obtained. Further, "Particle adjustment operation" in (Blue particle-2) was carried out in place of the particle size adjustment operation (operation of unifying the particle size by means of a micro type sonic sifter) in the final stage in the step of "d) Manufacturing of particles".

(White Particle-3)

a) Preparation of Dispersion D

Styrene monomer: 53 parts by weight

Titanium oxide (TIPAQUE CR63: manufactured by Ishihara Sangyo Kaisha

Ltd.): 45 parts by weight

Charge control agent (COPY CHARGE PSY VP2038: manufactured by Clariant Japan KK): 2 parts by weight The mixture having the composition described above was subjected to ball mill grinding using a 10-mm-dia zirconia ball for 20 hours to obtain a dispersion D.

b) Preparation of Calcium Carbonate Dispersion E

Calcium carbonate: 40 parts by weight

Water: 60 parts by weight

The mixture having the composition described above was subjected to fine grinding in the same manner as in the manufacturing of the dispersion D to obtain a calcium carbonate dispersion E.

c) Preparation of Mixed Solution F

2% CELLOGEN aqueous solution: 4.3 g

Calcium carbonate dispersion B: 8.5 g

20% saline solution: 50 g

The mixture having the composition described above was subjected to degassing by means of an ultrasonic dispersing device for 10 minutes, and then stirred by an emulsifier to obtain a mixed solution F.

d) Manufacturing of Particles

First, 35 g of the dispersion D, 1 g of divinylbenzene, and 0.35 g of a polymerization initiator AIBN (azoisobutyronitrile) were weighed out, and sufficiently mixed. The resulting mixture was subjected to degassing by means of an ultrasonic dispersing device. The mixture was charged in the mixed solution F, and emulsification was carried out by means of an emulsifier. Then, the emulsion thus formed was charged into an bottle, and a silicone stopper was then put on the bottle. The emulsion was sufficiently subjected to degassing under reduced pressure. Thereafter, a nitrogen gas was sealed therein. Then, the reaction was performed at 70° C. for 10 hours to manufacture particles. After cooling, the resulting particles were taken out, and calcium carbonate was decomposed with an excessive amount of a 3 mol/l hydrochloric acid, followed by filtration. Thereafter, the particles were washed with a sufficient amount of distilled water several times, and dried by means of a vacuum dryer, followed by cracking. Then, the dried particles were classified by means of a pneumatic classifier (Elbow Jet: manufactured by Nittetsu Kogyo). Consequently, white particles-3 with a volume arithmetic mean diameter equal to 13.8 $\mu$m, and a coefficient of variation H equal to 17.2% were manufactured.

(White Particle-4)

White particles-4 with a volume arithmetic mean diameter equal to 14.5 $\mu$m, and a coefficient of variation H equal to 20% were obtained in the same manner as with (White particle-3), except that the classification conditions by means of a pneumatic classifier in the step of "d) Manufacturing of particles" were changed in (White particle-3).

(Blue Particle-3)

In the manufacturing method described in the paragraphs of (White particle-3), the following step was carried out in place of the step of "a) Preparation of dispersion D" to obtain a dispersion D'. The subsequent steps in (White particle-3) were carried out by using the dispersion D' obtained. Consequently, blue particles-3 with a volume arithmetic mean diameter equal to 13.4 $\mu$m, and a coefficient of variation H equal to 17.5% were obtained.

a) Preparation of dispersion D'

Styrene monomer: 90 parts by weight

Blue pigment (C.I. Pigment Blue 15:3, SANYO CYANINE BLUE KRO: Sanyo Color Works, Ltd.): 10 parts by weight The mixture having the composition described above was subjected to ball mill grinding using a 10-mm-dia zirconia ball for 20 hours to obtain a dispersion D'.

(Blue Particle-4)

Blue particles-4 with a volume arithmetic mean diameter equal to 14.2 $\mu$m, and a coefficient of variation H equal to 18.5% were manufactured in the same manner as with (White particle-3), except for the following steps. That is, the step of "a) Preparation of dispersion D'" of (Blue particle-3) was carried out in place of the step of "a) Preparation of dispersion D" in (White particle-3) to obtain a dispersion D'. The subsequent steps in (White particle-3) were carried out by using the dispersion D' obtained. Further, the classification conditions by means of a pneumatic classifier in the step of "d) Manufacturing of particles" were changed.

Preparation of Mixed Particles

Respective particles thus obtained were used in combinations shown in Table 1 below. Respective particles in such combinations were mixed to prepare mixed particles to be used in Examples and Comparative Examples. In this process, the white particles and the blue particles were used in such a mixing ratio (based on the number of particles) that white particles: blue particles=2:1.

TABLE 1

|  | White particle | Blue particle |
| --- | --- | --- |
| Example 1 | White particle-1 | Blue particle-1 |
| Example 2 | White particle-2 | Blue particle-2 |
| Comparative Example 1 | White particle-3 | Blue particle-3 |
| Comparative Example 2 | White particle-4 | Blue particle-4 |

Manufacturing of Image Display Medium

Mixed particles of each type thus obtained were sealed in the space between the substrates (display substrate 8 and non-display substrate 18) disposed opposing to each other.

By applying a voltage (500 V) across the transparent electrode 4 and the electrode 14 of the image formation apparatus obtained, a desired electric field was allowed to act on the groups of particles between the display substrate 8 and the non-display substrate 18. Consequently, respective particles 22 and 24 move between the display substrate 8 and the non-display substrate 18. By switching the polarity of the voltage applied, respective types of particles 22 and 24 move in mutually different directions between the display substrate 8 and the non-display substrate 18. By repeatedly switching the voltage polarity, they move back and forth between the display substrate 8 and the non-display substrate 18. In this process, the particles 22 and the particles 24 are charged in mutually different polarities by the collisions between respective particles 22 and 24, and between the particles 22 and 24 and the display substrate 8 or the non-display substrate 18.

In this example, the white particles-1 and the blue particles-1 are charged positively and negatively, respectively, so that they move in mutually different directions in response to the electric field between the display substrate 8 and the non-display substrate 18. If the electric field is fixed in only one direction, respective types of particles 22 and 24 adhere to their corresponding display substrate 8 or the non-display substrate 18 to display a uniform high-density and high-contrast image having no irregularity.

Evaluation Test

In the image formation apparatus using each type of the mixed particles of Examples or Comparative Examples, the aforesaid polarity switching of the voltage was conducted every second, thereby to move respective types of particles 22 and 24 in mutually different directions between the display substrate 8 and the non-display substrate 18 every second. Thus, 1600 cycles of the switching operation were repeated. Subsequently, the polarity switching of the voltage was conducted every 0.1 second. Then, the cycle evaluation was conducted repeatedly until a significant reduction in reflection density was observed with the polarity switching interval. Thus, the number of cycles until the reduction in reflection density resulted in the unusable conditions was evaluated, and taken as the evaluation index of the durability. Further, the overall stability at this step was evaluated by the following indexes. The results are shown in Table 2 below.

Indexes of Overall Stability Evaluation

Good: The reduction in image contrast associated with repeated cycles is overall uniform, and the image display with no irregularity is stable.

Bad: The reduction in image contrast associated with repeated cycles occur at the end portion of a unit cell plate, and partial contrast reductions occur in a large number of areas, resulting in overall nonuniform irregularity, so that a clear display cannot be provided.

TABLE 2

|  | Durability (×1000 cycles) | Overall stability evaluation |
| --- | --- | --- |
| Example 1 | 150 | Good |
| Example 2 | 120 | Good |
| Comparative Example 1 | 30 | Bad |
| Comparative Example 2 | 15 | Bad |

As described above, according to the present invention, there can be provided an image display medium which shows little change of the display image density, and also little change of the uniformity of the display image density, and is stable in density contrast, even when display images are repeatedly rewritten over a long period, and an image formation apparatus using the same.

The entire disclosure of Japanese Patent Application No. 2000-402885 filed on Dec. 28, 2000 including specification, claims, drawings and abstract is incorporated herein by reference in its entirety.

What is claimed is:

1. An image display medium, comprising:

a pair of substrates disposed opposing to each other; and particle groups comprising at least two types of particles sealed in a space between the pair of the substrates, at least one type thereof having a positively chargeable property, and at least one of others having a negatively chargeable property, and the positively and negatively chargeable types of particles being different colors, wherein the value of a coefficient of variation in each particle sized distribution of both the positively and negatively chargeable types of particles is approximately not more than 10%.

2. The image display medium according to claim 1, wherein one type of the positively and negatively chargeable types of particles is of white color.

3. The image display medium according to claim 2, wherein the white color type of particles contain a coloring material, and the coloring material is titanium oxide.

4. The image display medium according to claim 1, wherein at least one of the positively chargeable type of particles and the negatively chargeable type of particles is obtained through a granulation process by moving an oil phase in which components making up the particles have been dissolved and dispersed to an aqueous phase through a film having pores.

5. An image formation apparatus which forms an image on the image display medium according to claim 1, comprising:

an electric field generation part which generates an electric field corresponding to an image between the pair of the substrates.

6. The image display medium according to claim 1, wherein at least one of the positively chargeable type of particles and the negatively chargeable type of particles is obtained through a granulation process by moving an oil phase in which components making up the particles have been dissolved to an aqueous phase through a film having pores.

7. The image display medium according to claim 1, wherein at least one of the positively chargeable type of particles and the negatively chargeable type of particles is obtained through a granulation process by moving an oil phase in which components making up the particles have been dispersed to an aqueous phase through a film having pores.

8. The image display medium according to claim 1, wherein at least one type of the at least two types of particles contains a charge control agent.

9. The image display medium according to claim 8, wherein the charge control agent makes up approximately 0.1% to 10% of the mass of the at least one type of particle.

10. The image display medium according to claim 1, wherein at least one type of the at least two types of particles contains a resistance modifier.

11. The image display medium according to claim 10, wherein the resistance modifier makes up approximately 0.1% to 10% of the mass of the at least one type of particle.

12. The image display medium according to claim 10, wherein the resistance modifier has a volume resistivity of approximately $1 \times 10^4$ Ωcm or less.

* * * * *